Aug. 7, 1962 F. J. ALTMAN 3,048,782
SIGNAL RECEIVING SYSTEM
Filed Nov. 9, 1959 3 Sheets-Sheet 1

INVENTOR.
FREDERICK J. ALTMAN
BY Alfred C. Hill
AGENT

Aug. 7, 1962 F. J. ALTMAN 3,048,782

SIGNAL RECEIVING SYSTEM

Filed Nov. 9, 1959 3 Sheets-Sheet 2

INVENTOR.
FREDERICK J. ALTMAN
BY Alfred C. Hill
AGENT

Aug. 7, 1962 F. J. ALTMAN 3,048,782

SIGNAL RECEIVING SYSTEM

Filed Nov. 9, 1959 3 Sheets-Sheet 3

INVENTOR.
FREDERICK J. ALTMAN
BY Alfred C. Hill
AGENT

United States Patent Office 3,048,782

Patented Aug. 7, 1962

3,048,782

SIGNAL RECEIVING SYSTEM

Frederick J. Altman, Ridgewood, N.J., assignor to International Telephone and Telegraph Corporation, Nutley, N.J., a corporation of Maryland Filed Nov. 9, 1959, Ser. No. 851,921
20 Claims. (Cl. 325—305)

This invention relates to signal receiving systems and more particularly to an improved single sideband suppressed carrier receiving system which may be advantageously utilized in forward-scatter communication systems.

In the early days of UHF (ultra high frequency) long-range system developments, frequency modulation (FM) techniques were employed due to the apparent advantages of signal-to-noise enhancement and the convenience of the systems already being established which could be quickly and easily adopted for this UHF long-range communication. Thus, in the advent of tropospheric scatter systems, frequency modulation techniques were utilized primarily to provide the desired scatter propagation in communication. Diversity techniques were utilized with the forward-scatter systems to minimize the fading that takes place in such a system. Diversity techniques that have been developed for incorporation in an FM system were therefore important and the development proved that the technique affording the best near-threshold performance in a FM scatter system is that called an equal-gain combiner.

More recently and with additional emphasis being placed on single sideband transmission it has been discovered that single sideband systems have certain advantages over the FM systems which may be set forth as follows: (1) spectrum conservation, (2) superior performance against multipath fading and (3) less power required for a given channel signal-to-noise ratio. UHF single sideband systems useful in tropospheric radio systems are not completely without problems. In the development of such a system there were problems encountered in the frequency conversion of the audio signals to the UHF frequency range; efficient generation of high-power UHF single sideband signals with a minimum of distortion and transmission and reception of the single sideband signals through a medium having frequency selective fading and Doppler frequency shifts.

The arrangement disclosed herein is directed toward a solution to the reception problem in UHF single sideband systems and the discussion will be directed to such a receiving system. The single sideband signals which are received by applicant's receiving system may be produced in a well-known manner by the filter method or the phase shift method. With either technique, the audio signals are converted to the higher frequency by mixing with a carrier signal in a balanced modulator which provides for rejection of the carrier leaving substantially only the double sideband signals. With the phase-shift technique, one of the two sideband outputs generated by the mixing process is cancelled thereby providing only the desired sideband signal. With the filter technique, the desired sideband is selected by appropriate bandpass filter. A single frequency, called the pilot signal, derived from the carrier signal used in the first frequency conversion is transmitted along with the selected sideband signal. This pilot signal is used in the receiver for mixing with the sideband signals to produce the original signal. The relationship between the pilot and sideband must be preserved in the frequency conversion process in the exciter and during transmission through a medium where signals are subject to Doppler frequency shift. Thus, it is possible in the receiver to reconstruct the original signals with their original frequency and phase. With diversity reception, the output signals from each receiver are added together. Coherent phase relationships are therefore essential between these signals to realize the maximum advantage of diversity combination at the baseband level. With a transmitted pilot, the frequency and phase of the receiver output signals are not dependent directly on the frequency stability of the first conversion oscillator, the UHF carrier frequency in the exciter, or the UHF local oscillator signal in the receiver.

An AGC (automatic gain control) arrangement utilizing the pilot signal may be utilized to correct for fading. However, only the pilot end of the multiplex band will be kept constant in amplitude by the AGC action if frequency selective fading is present across the band. To overcome this it has been required to provide a slope equalizer circuit to correct for the proportional frequency response distortion across the band caused by frequency selective fading. To accomplish this, a tone signal is inserted at the opposite end of the band from the pilot and is transmitted along with the pilot signal and the multiplex signal. In the receiver, a filter extracts and detects this tone signal to develop a voltage to operate the slope equalizer which varies the frequency response of an amplifier stage linearly from no correction at the pilot end of the band to maximum correction at the tone end of the band. The frequency stability of the exciter oscillators and the receiver oscillator must be such that the received pilot signal will remain centered within the bandpass of the pilot extraction filter. This is required for the AGC system to maintain constant IF (intermediate frequency) amplifier output but, more important, the phase of the pilot must not shift in relation to the original signals in order that the phase of the output signal shall be coherent with those of the other receivers and thus provide for maximum diversity combiner effectiveness. Therefore, an AFC (automatic frequency control) signal must be employed to correct the receiver local oscillator frequency to keep the pilot centered within the extraction filters. For effective utilization of transmitter pilot, it is desirable that the level of transmitted pilot be low relative to the sideband signals. However, the signal-to-noise ratio for the pilot should be greater than the signal-to-noise ratio of a baseband signal in the receiver. The relative level of a transmitted pilot signal to the sideband signal depends upon the width of the pilot extraction filter which, in turn, depends upon the amount of Doppler frequency shift encountered, the stability of the exciter and receiver oscillators and the probable loss in combiner effectiveness.

Briefly, previous UHF single sideband receivers employed an antenna system to reduce the received signal to a subcarrier frequency range and a preselector filter which rejects the receiver image frequency and any nearby or associated transmitter frequency. A crystal mixer converts the received signal to the intermediate frequency signal by mixing with the local oscillator signal originating from an intermediate frequency oscillator and frequency multiplier. A low-noise preamplifier delivers the intermediate frequency signals to the intermediate frequency amplifier which has a wide dynamic range high-speed AGC circuit. Image frequency rejection for the single sideband demodulator is achieved in a sideband filter. The signal is further amplified and fed to the single sideband demodulator along with the output from the second of a cascade pair of pilot extraction crystal filters which is a clean signal equivalent to the pilot signal frequency which is equal to the intermediate frequency signal. The original baseboard signals are recovered and amplified and then combined with fixed signals from other diversity receivers. The pilot filters and phase discriminator produce an AFC signal that corrects the receiver local oscillator frequency to keep the pilot centered within the filters. The output signal of the first pilot filter is amplified and detected and returned to the IF amplifier as the AGC voltage.

A review of the design of the prior art UHF single sideband receiver outlined hereinabove points up that the necessary AFC and combining schemes are rather complex, especially if it is attempted to make them fail-safe. A more important consideration and disadvantage of the prior art system is the vulnerability to multipath effects. Selective fading makes it difficult to derive a proper control voltage for the combiner and further, the combiner distorts when the signals are presented at different levels by a different receiving channel. The AFC is needed to insure in-phase combining in the prior art arrangement. The crystal filter for pilot signal extraction requires a precision of at least 0.001%, the amplifier requires relatively high-drain tubes, and the motor for AFC control is required to be geared down so that the manual initial positioning is required. The baseband combiner control method employed in the prior art UHF single sideband receivers involves special circuitry to obtain the correct ratio squarer characteristics from the logarithmic AGC voltage. The gain-correcting control means involves a high-gain noise amplifier in an auxiliary loop which can be made fail-safe only by addition of pilot and squelch features. If an IF amplifier tube should fail, the noise decreases, calling for more gain, and the corrector makes the combiner grid and cathode voltages more positive so as to prevent proper utilization of the still good channels. If an RF (radio frequency) mixer crystal should fail, the AGC would cause a noise surge until the slow corrector operated. In the case of selective fading due to multipath propagation, a serious weakness of this type of combiner becomes apparent. It has been shown that signals of about the same level must be provided at all combiner grids to avoid distortion. This is manifestly difficult to accomplish if the frequency spectra are irregular and different, still more so if the control voltage representing the total signal is derived entirely from a pilot at one end of the signal band. Clearly, pilot amplitudes in all channels may be equal and yet different peak amplitudes impressed on the combiner grids. Slope equalizers will obviously overcome this serious difficulty, but even if an operational design is achieved, simplified and made fail-safe, it still cannot handle severe spectrum irregularities, in-band cancellation nulls in particular.

Therefore, an object of this invention is to provide a UHF single sideband receiving system eliminating or minimizing the difficulties of the prior art systems mentioned hereinabove.

Another object of this invention is to provide a UHF single sideband receiving system applicable to tropospheric scatter propagation systems enabling a reduction in the amount of equipment necessary relative to the amount of equipment employed in the prior are receiving systems.

Still another object of this invention is the provision of a UHF single sideband receiving system of the suppressed carrier type wherein fail-safe features are provided by simple means.

A further object of this invention is the provision of a UHF single sideband receiving system applicable to forward-scatter type propagation systems wherein selective fading due to multipath propagation is substantially reduced.

Still a further object of this invention is to provide a single sideband suppressed carrier receiving system employing equal-gain combining techniques which heretofore had been exploited in frequency modulation type systems only.

A feature of this invention is the provision of a single sideband suppressed carrier receiver comprising a source of reference signal having a frequency substantially equal to the frequency of the received pilot signal means responsive to said pilot signal and said reference signal to lock the reference signal in a predetermined phase relationship with respect to the pilot signal, a demodulator responsive to the received signals and means to couple said reference signal to said demodulator to produce at the output of said demodulator the intelligence sideband signal of the received signals.

Another feature of this invention is the provision of a pair of signal channels to receive single sideband signals, the received signals having random phase relationships relative to each other, means to detect the phase relationship between the signals in said signal channels and to correct the phase relationship thereof to enable the in-phase combining of the signals in the channels as employed in the equal-gain combining techniques of FM systems, said combined signal being the source of signals for my improved single sideband receiver hereinabove mentioned.

Still another feature of this invention is the provision of a means responsive to the pilot signal of the received signals and the signal of the source of reference signal to produce a control signal proportional to the amplitude of the received pilot signal and means coupling said control signal to control the amplitude of the received signals which in the case of the equal-gain diversity combining arrangement would mean controlling the amplitude of the intermediate frequency amplifiers equally.

A further feature of this invention is the provision of a pair of single sideband receivers each one operating on a separate single sideband signal for demodulation wherein the reference signal output injected into the demodulator of each of the receivers is shifted a predetermined amount in phase so that when the output signals of the demodulators are combined the resultant combined signal is equal in magnitude to either of the demodulator outputs.

Still a further feature of this invention is the provision of a single sideband receiving system incorporating a diversity receiving system of the equal-gain combining type applicable to forward-scatter communication systems including the above features with complete fail-safe and reliability features achieved in the combiner portion by fourfold diversity techniques and in the demodulation portion by symmetrical duplication of equipment.

The above-mentioned and other features and objects of this invention will become more apparent by reference to the following description taken in conjunction with the accompanying drawings, in which:

FIGS. 1 and 1A, joined along lines *a—a*, illustrate a schematic diagram in block form of a single sideband receiving system in accordance with the principles of this invention;

Figure 1:
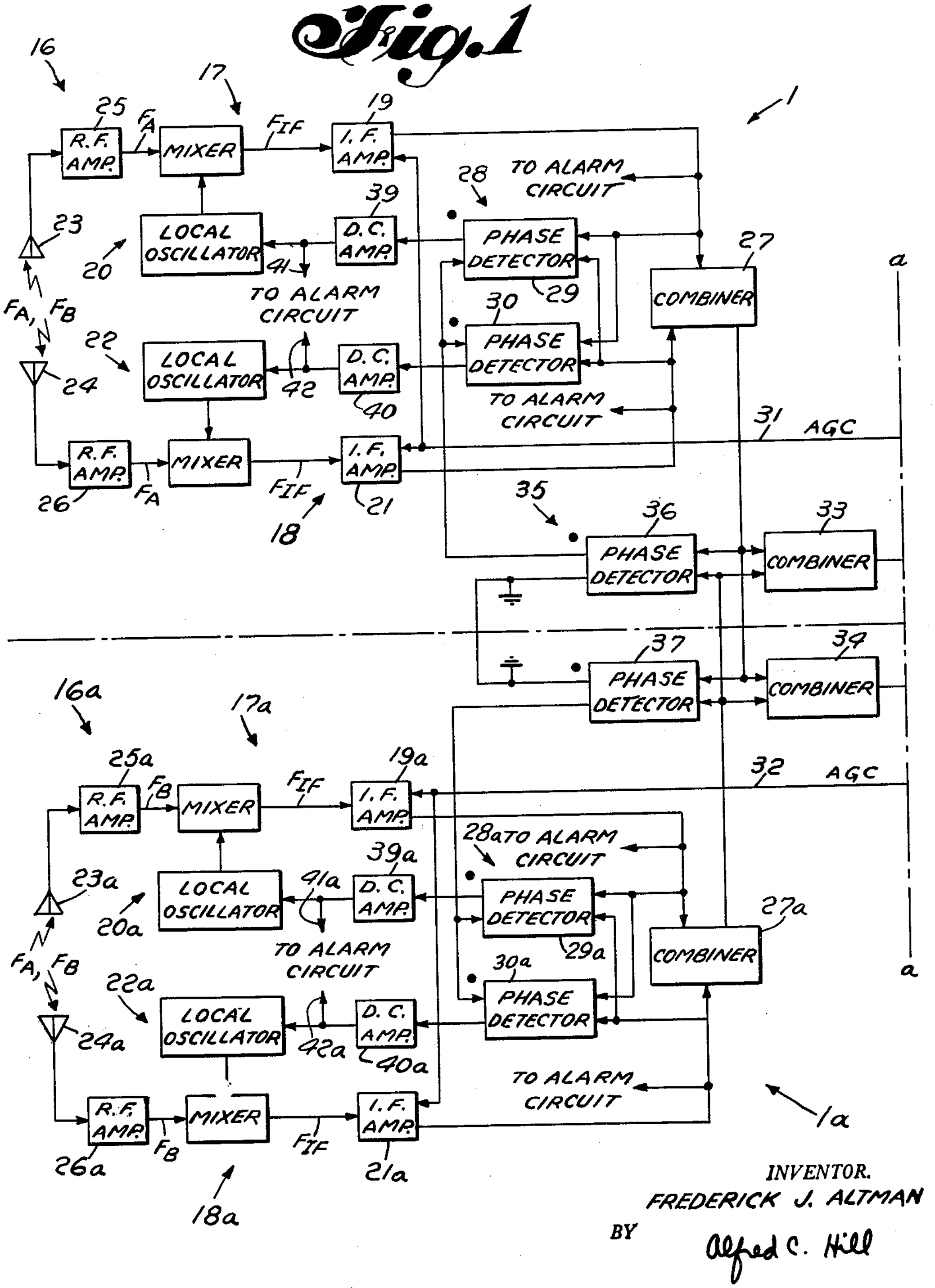
Figure 1A:
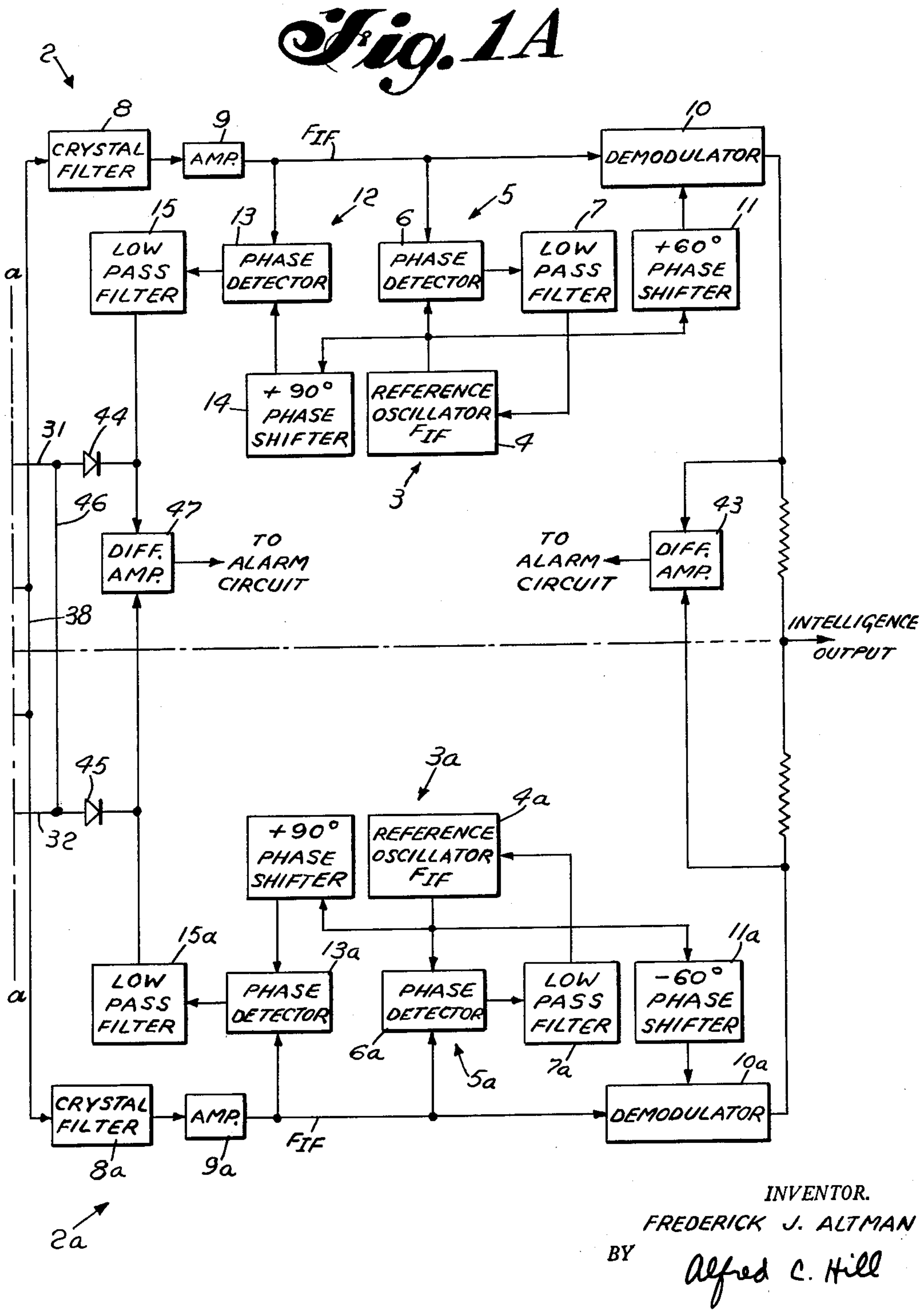

Referring to FIGS. 1 and 1A, the single sideband suppressed carrier receiving system of this invention is illustrated in the form of a four-fold diversity receiving system adaptable to forward-scatter type communication. The receiving system illustrated provides fail-safe and reliability features to be pointed out as the description progresses. Basically, the single sideband suppressed carrier receiver system of this invention includes a source of signals 1, said signals including a signal proportional to a single sideband suppressed carrier signal and a pilot signal having a frequency related to the frequency of the suppressed carrier and a demodulating portion 2 for acting upon signals of source 1 to recover the intelligence from the single sideband signal.

Arrangement 2 includes a source 3 of reference signals illustrated as an oscillator 4, having a frequency equal to the frequency of the pilot signal and a means 5 responsive to the pilot signal and the signal of the reference oscillator 4 to lock the reference signal in a predetermined phase relationship with respect to the pilot signal.

Means 5 is illustrated as including a phase detector 6 for developing a control voltage proportional to the phase difference between the pilot signal and the signal output of oscillator 4 and a lowpass filter 7 to couple the control signal to the reference oscillator to adjust the phase of the output signal thereof to establish the desired predetermined phase relationship between the reference signal and the pilot signal. The single sideband signal from source 1 is coupled by means of crystal filter 8 and amplifier 9 to a demodulator 10 which has coupled thereto the reference signal of oscillator 4 by means of a phase shifter 11 to bring about the injection of a locally generated, properly phased, signal into the demodulator for recovery of the intelligence signal transmitted by the single sideband signal. The arrangement 2 further includes a means 12 in the form of a phase detector 13 coupled to source 1 and to reference oscillator 4 through a phase shifter 14 to produce a control signal proportional to the amplitude of the pilot signal. This control signal is coupled through lowpass filter 15 back to source 1 to control the amplitude of the signals of source 1 and thereby constitutes an AGC control signal. In accordance with the illustration of FIGS. 1 and 1A, the AGC signal is applied to the diversity signal channels to be discussed hereinbelow to equally control the gain of the channels and thereby enable the utilization of equal-gain combining techniques in a single sideband suppressed carrier receiving system.

It will be observed that fail-safe and reliable features are provided by paralleling source 1 and arrangement 2 as illustrated generally at 1*a* and 2*a*. The components of source 1*a* and arrangement 2*a* operate identically to the components of source 1 and arrangement 2; therefore, the following detailed discussion will be directed primarily to source 1 and arrangement 2 with the identical components of source 1*a* and arrangement 2*a* being indicated by the same reference character followed by an "*a*."

Before proceeding with the detail of the over-all operation of the quadruple diversity receiving system for single sideband suppressed carrier signals illustrated in FIGS. 1 and 1A, it should be pointed out that in a quadruple diversity arrangement illustrated there are two dual diversity receiving systems operated in parallel to provide four single sideband suppressed carrier signals having uncorrelated and randomly varying phase relationships with respect to each other so that, as is well known in diversity techniques, the probability of the four signals fading simultaneously is tremendously reduced and also if one of the signal channels should be lost, communication will at the most revert to dual diversity reception. This fourfold diversity arrangement thereby provides a predetermined and desired reliability.

Referring to FIGS. 1 and 1A, a first dual diversity receiver 16 includes a first signal channel 17 and a second signal channel 18. Signal channel 17 includes an IF amplifier 19 to amplify the output of a heterodyning arrangement 20 and signal channel 18 includes an amplifier 21 to amplify the output of a heterodyning arrangement 22. As illustrated in FIGS. 1 and 1A, the receiver 16 is operated as a space diversity receiving arrangement with antennas 23 and 24 spaced apart so that there is an uncorrelated relationship between the signals received thereon. The outputs of antennas 23 and 24 are coupled to the input of heterdyning means 20 and 22 by amplifiers 25 and 26, respectively, tuned to a given radio frequency, say $F_A$. Heterodyning means 20 and 22 operate on the output signals of amplifiers 25 and 26 to produce the same intermediate frequency signal $F_{IF}$ for application to IF amplifiers 19 and 21. The output signals of these amplifiers are coupled to combiner 27 which may be a resistive additive network or a hybrid type circuit. The desired in-phase combining of the output signals of amplifiers 19 and 21 in combiner 27 is accomplished by employing a phase-comparing arrangement 28 including a pair of phase detectors 29 and 30 for reliability purposes. Phase detectors 29 and 30 each operate on the output signals of amplifiers 19 and 21 to produce a control signal proportional to the phase difference therebetween. The control signal is coupled to deterodyning means 20 to 22 in a push-pull manner to lock the two IF signals coupled to the combiner 27 in a 90 degree phase relationship. By properly including a quarterwave line in series with the appropriate one of the signals, it is possible to add the signal outputs of amplifiers 19 and 21 in-phase in combiner 27. This in-phase combining in combiner 27 is one portion of the equal-gain combining techniques previously employed in only FM systems.

To assure that proper combining is obtained in combiner 27, it is desirable to control the gain of amplifiers 19 and 21 equally. This is accomplished by developing an AGC control voltage in arrangement 2 and 2*a* which then is coupled on line 31 to amplifiers 19 and 21 for adjustment of the gain thereof equally to thereby provide the other portion of the equal-gain combining technique.

Receiver 16*a* includes the identical components and operates in the same manner as described above with respect to receiver 16 with the exception that the spaced antennas 23*a* and 24*a* of receiver 16*a* respond to a frequency $F_B$ which is spaced in frequency sufficiently from $F_A$ to provide frequency diversity between the two parallel dual space diversity receivers. Briefly, receivers 16*a* operates as follows. The outputs of antennas 23*a* and 24*a* are coupled to the signal channels 17*a* and 18*a* which include amplifiers 25*a* and 26*a* tuned to $F_B$ to assure that only the signal $F_B$ is applied to the input of heterodyning means 20*a* and 22*a*. The output of heterodying means 20*a* and 22*a* is a signal having the same intermediate frequency as the signal outputs of heterodying means 20 and 22. The intermediate frequency output signal of heterodyning means 20*a* and 22*a* are applied to amplifiers 19*a* and 21*a* for application to combiner 27*a*. As in the case of receiver 16 a phase-comparing arrangement 28*a* operates to compare the phase of the output of amplifiers 19*a* and 21*a* to produce a control voltage which is utilized to adjust the frequency in heterodyning means 20*a* and 22*a* to lock the signal outputs of amplifiers 19*a* and 21*a* in a 90 degree phase relationship. As in combiner 27, these phase-lock signals are combined substantially in phase in combiner 27*a* by passing the appropriate one of the signals through a quarter-wave line. The AGC control voltage developed in arrangement 2 and 2*a* is coupled across line 32 to amplifiers 19*a* and 21*a* to adjust the gain thereof equally to meet the equal-gain combining required.

The combined signal outputs of combiners 27 and 27*a* are coupled to combiners 33 and 34 paralleled to maintain the reliability standards of the receiving system. The action of combiners 33 and 34 is to combine the signal outputs of combiners 27 and 27*a* to provide a single signal output including the single sideband intelligence signal and the pilot signal for application in parallel to the arrangement 2 and 2*a* for recovery of the intelligence by demodulators 10 and 10*a* and also for the development of the AGC control voltage. A third phase-comparing arrangement 35 including phase detectors 36 and 37 is arranged to provide a phase-control voltage in a push-pull relationship such that the outputs of amplifiers 19 and 21 are properly phased with respect to the outputs of amplifiers 19*a* and 21*a* to enable the proper and desired in-phase combining in combiners 33 and 34. It will be observed that the outputs of combiners 33 and 34 are coupled through connector 38 so that if one of the combiners 33 or 34 should fail the other combiner will supply the desired input signal to arrangements 2 and 2*a* which constitutes another fail-safe feature.

The dots employed with the output connections of phase detectors 29 and 30, 36, 37 and 29a and 30a are the usual polarity dots employed in electronics representing a positive polarity and emphasizing the push-pull operation of the phase-adjusting arrangements of this quadruple diversity receiving system.

Before considering in greater detail the circuitry and certain relationships in the demodulation portion of the receiving system of this invention, let us recap certain of the advantages achieved by employing equal-gain combining outlined hereinabove. The equal-gain combiner employed in the receiving system of this invention offers a theoretical performance within one decibel of that of the optimal-ratio combiner which is not a significant difference particularly when considering the advantage this combining arrangement offers. The problem of providing equal signals required in the optimal-ratio combiner is not present in the equal-gain combiner and a derivation of suitable control voltage is facilitated, not in the sense that it is easy in the case at hand, but in two other important ways. First, auxiliary loops with fail-safe problems are not required beyond those required for AGC, and second, most significantly, the control is derived from the composite combined signal. This is considerably smoother than the individual signals according to well-known diversity statistics so that deep Rayleigh fades do not have to be followed nor do multipath nulls have to be followed. The required range of AGC action is thus considerably restricted.

Because of this statistical smoothing action provided in this type of diversity combining and development of the AGC control voltage from the combined signal, slope equalization does not appear to be necessary in this type of arrangement as it was in the arrangement set forth hereinabove with respect to the prior art receiving systems. The unnecessary slope equalization is highly probable since it is highly improbable that one signal will be appreciably larger than the rest and at the same time suffer severe selective fading. If this fading affects weak signals severely, or normal signals either weakly or with random slopes, averaging will reduce it to a negligible factor. It should be noted that in the equal-gain combiner where the signals are combined in-phase inputs of opposite sign throughout the band will not cancel but add. If a spectrum zero exists in the band, nothing can be done. In any case, only one slope equalizer is required now instead of four, or two in parallel for reliability.

The equal-gain combiner is inherently fail-save in that, if a tube or crystal mixer fails in any channel, control is still retained by the stronger channels and understood noise is not exaggerated. There is now no requirement for special control characteristics to obtain ratio-squaring from either linear or logarithmic voltages, but there is, of course, the problem of matching IF amplifier gain characteristics. This is not a serious difficulty but to prevent any trouble from this source the control voltage for AGC purposes would be applied to many IF stages to average the effects of tube differences. It has been found easy to match within 2 db over a 50 db range.

Using transmitted signals with a pilot for synchronization of the reference source 3 and 3a, it would be very difficult to derive the AGC control voltages from the pilot signals in the prior art arrangements since they usually are combined after demodulation since the pilot signals become D.C. and are at a very low level to avoid distortion in the demodulator. Furthermore, the complex AFC circuitry of the prior art arrangement must be repeated in every channel. These problems are circumvented by combining at IF after matching the phases of all channels. Then the smoothed pilot signal at the IF frequency is still available in the combined output.

As pointed out hereinabove the phase-lock circuitry employed in the equal-gain combiner arrangement utilizes a phase detector to lock the two signals of each pair of signals 90 degrees out of phase and are combined inphase by properly inserting a quarter-wave line in series with the appropriate one of the signals. This arrangement does not rely upon the phase of the pilot signal for combining but on the cross correlation between the two input spectra. Thus, if a cancellation minimum occurs in the signal frequency band, the region of maximum energy is automatically phased correctly for optimum utilization. For instance, if the minimum is near the intermediate frequency signal, the pilot signal may subtract but all channels add.

The four channel portion, or in other words, the fourfold diversity arrangement is now fail-safe as is well known and the part after combining in combiners 33 and 34 is duplicated for reliability. In the phase-comparing arrangements 28 and 28a, two phase detectors are employed, namely, phase detectors 29 and 30 and 29a and 30a respectively, for reliability. The connection between the phase detectors of the phase-comparing arrangement include D.C. amplifiers 39 and 40 and 39a and 40a. These D.S. amplifiers were not required in previous FM systems because IF amplitudes were not limited by distortion requirements. Thus, since single sideband signals have their IF amplitudes limited by distortion requirements it is nesessary to divide the D.C. amplifiers. Note that these D.C. amplifiers are fail-safe, since if one of the two in series fail the loop gain, already dependent on signal strength, merely drops 6 db. Since this failure is not obvious at the output, alarm circuits must be provided as indicated by terminals 41 and 42 and 41a and 42a.

Turning now to the demodulation portion of the single sideband suppressed carrier receiving system of this invention, the reference oscillator 4 is synchronized by the combined pilot signal by a phase-lock circuit, namely, means 5 which includes phase detector 6 and low-pass filter 7. To accommodate this phase-lock circuit, the crystal filters 8 and 8a must be widened sufficiently. The demodulators 10 and 10a are fed through phase shifters 11 and 11a. It is preferred for reliability purposes that the added outputs from demodulators 10 and 10a should have the same magnitude even though one of the outputs should not be present. This can be accomplished if phase shifter 11 advances the reference signal by a +60 degree phase shift and phase shifter 11a retards the reference signal by a −60 degree phase shift, or in other words, advance the phase of the reference oscillator signal 300 degrees. Again alarm circuits must be provided so that it will be obvious that a failure has occurred. The alarm circuit is a differential alarm as indicated by the employment of differential amplifier 43 whose output is coupled to an alarm circuit. Similar alarm circuits with long time constants are provided for paired IF channel outputs. The differential monitors may be made fail-safe by using a clamping diode to restrict output swing on one side if the tube fails.

The AGC voltage is derived by cross-correlation between the combined pilot signal and reference signal of reference oscillator 4 and 4a by shifting the reference signal 90 degrees in phase by phase shifter 14 and 14a for application to phase detectors 13 and 13a, respectively, to produce at the output of low-pass filters 15 and 15a a control signal varying in proportion to the amplitude of the combined pilot signal. In this arrangement, the low-pass filters 15 and 15a are able to replace the crystal filters formerly employed in the AGC circuit. The stronger of the two AGC control signals are selected by diodes 44 and 45 for application to all of the IF amplifiers 19, 21, 19a and 21a. If the stronger control signal is passed by diode 44, the AGC control signal is coupled over line 31 to amplifiers 19 and 21 and this same AGC control voltage is coupled over line 46 to line 32 for application to IF amplifiers 19a and 21a. If the AGC control signal is passed by diode 45, amplifiers 19 and 21 receive their AGC control signals over conductors 46 and 31. It is necessary to provide a differential alarm circuit to indicate if a failure has occurred in the AGC control. This differential alarm circuit is provided by utilizing differential amplifier 47.

Figure 2:
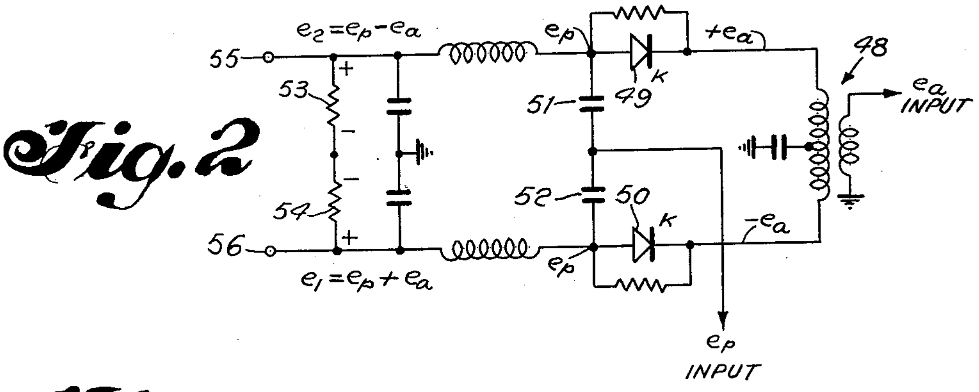
FIG. 2 is a schematic diagram illustrating an example of the phase detectors employed in FIGS. 1 and 1A.
Figure 3:
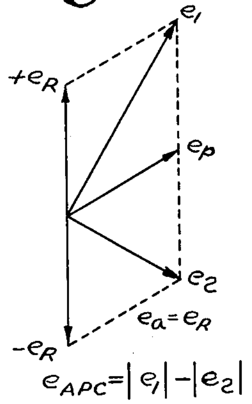
FIGS. 3, 4 and 5 are vector diagrams illustrating the operation of the phase-locking, the production of the AGC control voltage and the combining of the output signals of the demodulators, respectively, of the system of FIG. 1.

Referring to FIG. 2, a schematic diagram of a phase detector which may be utilized in the system of this invention is illustrated. This particular phase detector has an advantage in that it is fail-safe since no tubes are employed therein. Hereinbelow the operation of this particular phase detector will be discussed with reference to the arrangements of the demodulation portion 2 to illustrate the phase-lock accomplished therein and also the development of the AGC voltage. It is to be remembered, however, that this same discussion of the operation applies to the phase detectors employed in the equal-combining arrangements of quadruple diversity combining systems. With respect to the operation of the circuit of FIG. 2 for obtaining the desired 90 degree phase-lock between the reference signal of oscillator 4 and the combined pilot signal, the output of reference oscillator 4 is coupled to the primary of transformer 48 and appears as a voltage with plus and minus phase on the respective ends of the secondary of transformer 48 with respect to the phase of the input signal at the primary of transformer 48. This is vectorally represented in FIG. 3 by the vector labeled $+e_R$ and $-e_R$. These voltages are applied to the cathodes of diodes 49 and 50. The combined pilot signal is coupled through condensers 51 and 52 to the anodes of diodes 49 and 50. This voltage is indicated by the vector labeled $e_P$. Thus, across diode 49 appears the difference voltages: $e_P-e_R$ and across the diode 50 appears the difference $e_P-(-e_R)$ or $e_P+e_R$. These sum and difference voltages are detected by diodes 49 and 50 and the D.C. circuits including resistors 53 and 54 are arranged so as to substract the resultant D.C. outputs. The inequality appears between terminals 55 and 56. Vector $e_1$ of FIG. 3 represents the output of diode 50 while the vector $e_2$ of FIG. 3 represents the output of diode 49. Due to the subtractive relationship of resistors 53 and 54, the automatic phase control is the arithmetic difference of the absolute values of the vectors $e_1$ and $e_2$. The vector diagram of FIG. 3 illustrates that if $e_P$ lags $e_a$ by less than 90 degrees, the magnitude of $e_P+e_a$ will exceed that of $e_P-e_a$ and if $e_P$ lags $e_a$ by more than 90 degrees, the magnitude of $e_P-e_a$ will be greater than that of $e_P+e_a$. At exactly a 90 degrees phase difference between $e_P$ and $e_a$, $e_P+e_a$ will equal $e_P-e_a$. A positive or negative frequency control voltage (APC) is therefore obtained between terminals 55 and 56, if $e_P$ is less or more than 90 degrees from $e_a$ and the local oscillators are driven to maintain $e_P$ and $e_a$ at a 90 degree phase angle.

Figure 4:
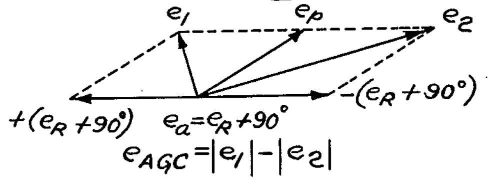

Referring to vector diagram of FIG. 4 and in conjunction with a description of the operation of FIG. 2 relative to the production of the AGC control voltage, it will be observed that $e_a$ is equal to $e_R$+90 degree phase shift as provide by phase shifter 14. Thus, at the cathode of diodes 49 and 50 we will have $+(e_R+90°)$ and $$-(e_R+90°)$$

respectively. $e_P$ will appear at the anode of both the diodes 49 and 50 and thus across the resistors 53 and 54 will be developed a control voltage which is amplitude sensitive rather than phase sensitive as was the case when the circuit of FIG. 2 was employed for developing a phase control voltage. Again it will be observed that the control voltage for AGC purposes is equal to the difference between the absolute values of the voltages $e_1$ and $e_2$.

Referring now with very particularity to the demodulation which takes place in demodulators 10 and 10*a* of FIG. 1A, and the combination of the output derived therefrom, the following mathematical expressions may be employed to demonstrate what happens when the output signal of reference oscillators 4 and 4*a* are injected into the demodulators 10 and 10*a* with a plus 60 degree and a minus 60 degree phase shift, respectively.

The received single sideband suppressed carrier signal can be expressed as follows:

$$e_{ssb}(t)=\tfrac{1}{2}\sum_{n=1}^{n}E_n \cos[(\omega_c+\omega_n)t+\phi_c+\phi_n] \qquad (1)$$

where $\omega_c=2\pi f_c$ where $f_c$=carrier frequency, $\omega_n=2\pi f_n$ where $f_n$=modulating frequency, $\phi_c$=phase angle of carrier signal, $\phi_n$=phase angle of modulation signal, $E_n$=amplitude of received signal and $t$=time.

The signal of the reference oscillator can be represented by the following equation:

$$e_{ref}(t)=\cos(\omega_{ref}t+\phi_{ref}) \qquad (2)$$

where $\omega_{ref}=2\pi f_{ref}$ where $f_{ref}$=frequency of reference signal and $\phi_{ref}$=the phase angle of the reference signal.

The signal injected into the demodulator can be expressed by the following general equation:

$$e_{1c}(t)=\cos(\omega_{1c}t+\phi_{1c}) \qquad (3)$$

where $\omega_{1c}=2\pi f_{1c}$ where $f_{1c}$=frequency of injected signal and $\phi_{1c}$=the phase angle of the injected signal which is equal to $\phi_{ref}+\phi_s$ where $\phi_s$=phase shift introduced by phase shifters 11 and 11*a*.

The mathematical expression for the output of demodulators 10 and 10*a* may be expressed as follows:

$$e_{demod}(t)=\sum_{n=1}^{n}E_n \cos[(\omega_c-\omega_{1c}+\omega_n)t+\phi_c-\phi_{ref}-\phi_s+\phi_n] \qquad (4)$$

In accordance with the illustration $\omega_c=\omega_{1c}$; $\phi_c-\phi_{ref}=90°$; $\phi_n=0$. Therefore, $$e_{demod}(t)=\sum_{n=1}^{n}E_n \cos(\omega_n t+90°-\phi_s) \qquad (5)$$

For demodulator 10 $\phi_s=60°$ therefore $$e_{demod}(t)=\sum_{n=1}^{n}E_n \cos(\omega_n t+30°) \qquad (6)$$

and for demodulator 10*a* $\phi_s=-60°$ therefore, $$e_{demod}(t)=\sum_{n=1}^{n}E_n \cos(\omega_n t+150°) \qquad (7)$$

Figure 5:
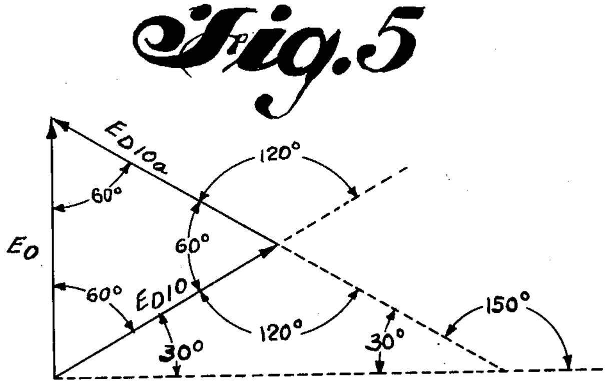

Equations 6 and 7 are the mathematical representation of the resultant signals $E_{D10}$ and $E_{D10a}$, respectively, at the output of demodulators 10 and 10*a*. When these are combined in a resistive manner the resultant is an output which has the same magnitude as either of the magnitudes of voltages $E_{D10}$ or $E_{D10a}$ but of course with a different phase relationship. The vector solution to the addition of the output of demodulators 10 and 10*a* is illustrated in FIG. 5 wherein the appropriate phase angles are illustrated in the diagram to produce the equilateral triangle consisting of voltages $E_{D10}$, $E_{D10a}$ and $E_0$ the resultant at the output terminal 57. Thus it is observed that if either one of demodulation portions 2 or 2*a* should fail to produce at the output thereof a signal the resultant intelligence output will have the same magnitude and hence, the output from the single sideband receiving system of this invention is constant even with the loss of signal from one of the demodulation portions.

While I have described above the principles of my invention in connection with specific apparatus, it is to be clearly understood that this description is made only by way of example and not as a limitation to the scope of my invention as set forth in the objects thereof and in the accompanying claims.

I claim:

1. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, means responsive to said pilot signal and said reference signal to produce a control signal having an amplitude proportional to the phase difference between said pilot signal and said reference signal, means to couple said control signal to said source of reference signal to lock said reference signal in a predetermined phase relationship with respect to said pilot signal, a demodulator coupled to said source of signals and means coupled to said source of reference signal to couple said reference signal to said demodulator to produce at the output of said demodulator the intelligence of said sideband signal.

2. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, means responsive to said pilot signal and said reference signal to lock said reference signal in a predetermined phase relationship with respect to said pilot signal, means responsive to said pilot signal and said reference signal to produce a control signal proportional to the amplitude of said pilot signal, means coupling said control signal to said source of signals to control the amplitude of the signals of said source of signals, a demodulator coupled to said source of signals and means coupled to said source of reference signal to couple said reference signal to said demodulator to produce at the output of said demodulator the intelligence of said sideband signal.

3. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, means responsive to said pilot signal and said reference signal to lock said reference signal in a 90 degree phase relationship with respect to said pilot signal, means responsive to said pilot signal and said reference signal to produce a control signal proportional to the amplitude of said pilot signal, means coupling said control signal to said source of signals to control the amplitude of the signals of said source of signals, a demodulator coupled to said source of signals and means coupled to said source of reference signal to couple said reference signal to said demodulator to produce at the output of said demodulator the intelligence of said sideband signal.

4. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, a phase detector coupled to said source of signals and said source of reference signal to produce a first control signal proportional to the phase difference between said pilot signal and said reference signal, means to couple said first control signal to said reference source to lock said reference signal and said pilot signal in a 90 degree phase relationship, means responsive to said pilot signal and said reference signal to produce a second control signal proportional to the amplitude of said pilot signal, means coupling said second control signal to said source of signals to control the amplitude of the signals of said source of signals, a demodulator coupled to said source of signals and means coupled to said source of reference signal to couple said reference signal to said demodulator to produce at the output of said demodulator the intelligence of said sideband signal.

5. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, means responsive to said pilot signal and said reference signal to lock said reference signal in a predetermined phase relationship with respect to said pilot signal, a phase detector coupled to said source of signals, a phase shifter coupled to the output of said source of reference signal to shift said reference signal 90 degrees, means coupling the output of said phase shifter to said phase detector to provide at the output of said phase detector a control signal proportional to the amplitude of said pilot signal, means coupling said control signal to said source of signals to control the amplitude of the signals of said source of signals, a demodulator coupled to said source of signals and means coupled to said source of reference signal to couple said reference signal to said demodulator to produce at the output of said demodulator the intelligence of said sideband signal.

6. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, means responsive to said pilot signal and said reference signal to lock said reference signal in a predetermined phase relationship with respect to said pilot signal, means coupled to said source of signals and said source of reference signal to produce a control signal proportional to the amplitude of said pilot signal, means coupling said control signal to said source of signals to control the amplitude of the signals of said source of signals, a demodulator coupled to said source of signals, a phase shifter coupled to the output of said source of reference signal to shift in phase said reference signal a predetermined amount and means coupled to the output of said phase shifter to couple said phase-shifted reference signal to said demodulator to produce at the output of said demodulator the intelligence of said sideband signal.

7. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, a first phase detector coupled to said source of signals and said source of reference signal to produce a first control signal proportional to the phase difference between said reference signal and said pilot signal, means to couple said first control signal to said source of reference signal to lock said reference signal in a predetermined phase relationship with respect to said pilot signal, a second phase detector coupled to said source of signals, a phase shifter coupled to the output of said source of reference signal to shift said reference signal in phase 90 degrees, means coupling the output of said phase shifter to said second phase detector to produce a second control signal proportional to the amplitude of said pilot signal, means coupling said second control signal to said source of signals to control the amplitude of the signals of said source of signals, a demodulator coupled to said source of signals and means coupled to said source of reference signal to couple said reference signal to said demodulator to produce at the output of said demodulator the intelligence of said sideband signal.

8. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, means responsive to said pilot signal and said reference signal to lock said reference signal in a predetermined phase relationship with respect to said pilot signal, a phase detector coupled to said source of signals, a first phase shifter coupled to said source of reference signal to shift said reference signal 90 degrees, means coupling said phase-shifted reference signal to said phase detector to produce a control signal proportional to the amplitude of said pilot signal, means coupling said control signal to said source of signals to control the amplitude of the signals of said source of signals, a demodulator coupled to said source of signals, a second phase shifter coupled to the output of said source of reference signal to shift said reference signal a predetermined amount in phase, and means coupled to the output of said phase shifter to couple said phase-shifted reference signal to said demodulator to produce at the output of said demodulator the intelligence of said sideband signal.

9. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, a phase detector coupled to the output of said signal source and the output of said source of reference signal to product a first control voltage proportional to the phase difference between said pilot signal and said reference signal, means coupling said first control signal to said source of reference signal to lock said reference signal in a 90 degree phase relationship with respect to said pilot signal, means coupled to said source of signals and said source of reference signal to produce a second control signal proportional to the amplitude of said pilot signal, means coupling said second control signal to said source of signals to control the amplitude of the signals of said source of signals, a demodulator coupled to said source of signals, a phase shifter coupled to the output of said source of reference signal to shift said reference signal a predetermined amount in phase, and means coupling the output of said phase shifter to said demodulator to couple said phase-shifted reference signal thereto to produce at the output of said demodulator the intelligence of said sideband signal.

10. A single sideband suppressed carrier receiver comprising a source of signals, said signals including a signal proportional to a single sideband suppressed carrier signal and a pilot signal having a frequency related to the frequency of said suppressed carrier, a source of reference signal having a frequency substantially equal to the frequency of said pilot signal, a first phase detector coupled to said source of signals and said source of reference signal to produce a first control signal proportional to the phase difference between said pilot signal and said reference signal, means coupling said first control signal to said source of reference signal to lock said reference signal in a 90 degree phase relationship with respect to said pilot signal, a second phase detector coupled to said source of signals, a first phase shifter coupled to the output of said source of reference signal to shift said reference signal 90 degrees, means coupling the output of said first phase shifter to said second phase detector to produce a control signal proportional to the amplitude of said pilot signal, means coupling said control signal to said source of signals to control the amplitude of the signals of said source of signals, a demodulator coupled to said source of signals, a second phase shifter coupled to said source of reference signal to shift said reference signal a predetermined amount in phase, and means coupling the output of said second phase shifter to said demodulator to couple said phase-shifted reference signal to said demodulator to produce at the output of said demodulator the intelligence of said sideband signal.

11. A single sideband suppressed carrier receiving system comprising a first source of signals, a second source of signals, the signals of each of said sources being substantially inphase with each other and including a signal proportional to a single sideband suppressed carrier signal and a pilot signal having a frequency related to the frequency of said suppressed carrier, a first source of reference signal having a frequency substantially equal to the frequency of said pilot signal, a second source of reference signal having a frequency substantially equal to the frequency of said pilot signal, a first means responsive to the pilot signal of said first signal source and the reference signal of said first source of reference signal to produce a first control signal having an amplitude proportional to the phase difference between the pilot signal of said first signal source and the reference signal of said first source of reference signal, means coupling said first control signal to said source of reference signal to lock the reference signal of said first source of reference signal in a predetermined phase relationship with respect to the pilot signal of said first source of signals, a second means responsive to the pilot signal of said second source of signals and the reference signal of said second source of reference signal to produce a second control signal having an amplitude proportional to the phase difference between the pilot signal of said second signal source and the reference signal of said second source of reference signal, means coupling said second control signal to said second source of reference signal to lock the reference signal of said second source of reference signal in a predetermined phase relationship with respect to the pilot signal of said second source of signals, a first demodulator coupled to said first source of signals, a second demodulator coupled to said second source of signals, a first means coupled to said first source of reference signal to couple said reference signal to said first demodulator to produce at the output of said first demodulator the intelligence of said sideband signal, a second means coupled to said second source of reference signal to couple said reference signal to said second demodulator to produce at the output of said second demodulator the intelligence of said sideband signal and a means coupled in common to the output of said first and second demodulators to combine the demodulated intelligence of said sideband signals into a single intelligence output signal.

12. A single sideband suppressed carrier receiving system comprising a first source of signals, a second source of signals, the signals of each of said sources being substantially inphase and including a signal proportional to a single sideband suppressed carrier signal and a pilot signal having a frequency related to the frequency of said suppressed carrier, a first source of reference signal having a frequency substantially equal to the frequency of said pilot signal, a second source of reference signal having a frequency substantially equal to the frequency of said pilot signal, a first means responsive to the pilot signal of said first source of signals and the reference signal of said first source of reference signal to lock the reference signal of said first source of reference signal in a predetermined phase relationship with respect to the pilot signal of said first source of signals, a second means responsive to the pilot signal of said second source of signals and the reference signal of said second source of reference signal to lock the reference signal of said first source of reference signal in a predetermined phase relationship with respect to the pilot signal of said second source of signals, a first demodulator coupled to said first source of signals, a second demodulator coupled to said second source of signals, a first phase shifter coupled to said first source of reference signal to couple the reference signal of said first source of reference signal to said first demodulator in a first predetermined phase relationship with respect to the phase of the reference signal of said first source of reference signal to produce at the output of said first demodulator the intelligence of said sideband signal, a second phase shifter coupled to said second source of reference signal to couple the reference signal of said second source of reference signal to said second demodulator in a second predetermined phase relationship with respect to the phase of the reference signal of said second source of reference signal to produce at the output of said second demodulator the intelligence of said sideband signal, and means coupled in common to the outputs of said first and second demodulators to combine the demodulated intelligence of said sideband signals into a single intelligence signal, said first and second predetermined phases of said first and second phase shifters being related to each other to provide the same amplitude output signal at the output of said common means even if one of the signals of said sources of signals is lost.

13. A single sideband suppressed carrier receiving system comprising a first source of signals, a second source of signals, the signals of said first and second sources of signals each being substantially inphase with each other and including a signal proportional to a single sideband suppressed carrier signal and a pilot signal having a frequency related to the frequency of said suppressed carrier, a first source of reference signal having a frequency substantially equal to the frequency of said pilot signal, a second source of reference signal having a frequency substantially equal to the frequency of said pilot signal, a first means responsive to the pilot signal of said first source of signals and the reference signal of said first source of reference signal to lock the reference signal of said first source of reference signal in a 90 degree phase relationship with respect to the pilot signal of said first source of signals, a second means responsive to the pilot signal of said second source of signals and the reference signal of said second source of reference signal to lock the reference signal of said second source of reference signal in a 90° phase relationship with respect to the pilot signal of said second source of signals, a first demodulator coupled to said first source of signals, a second demodulator coupled to said second source of signals, a first phase shifter coupled to said first source of reference signals to advance the phase of the reference signal of said first source of reference signal 60 degrees, means coupling the output of said first phase shifter to said first demodulator to produce at the output of said first demodulator the intelligence of said sideband signal, a second phase shifter coupled to said second source of reference signal to retard the phase of the reference signals of said second source of reference signal 60 degrees, means coupling the output of said second phase shifter to said second demodulator to produce at the output of said second demodulator the intelligence of said sideband signal, and a means coupled to the output of each of said first and second demodulators to combine the demodulated intelligence of said sideband signals into a single intelligence signal output, said single signal output having the same amplitude even if the signal of one of said sources of signals is lost.

14. A single sideband suppressed carrier receiving system comprising a first source of signals, a second source of signals, the signals of each of said first and second sources of signals being substantially inphase and including a signal proportional to a single sideband suppressed carrier signal and a pilot signal having a frequency related to the frequency of said suppressed carrier, a first source of reference signal having a frequency substantially equal to the frequency of said pilot signal, a second source of reference signal having a frequency substantially equal to the frequency of said pilot signal, a first means responsive to the pilot signal of said first source of signals and the reference signal of said first source of reference signal to lock the reference signal of said first source of reference signal in a predetermined phase relationship with the pilot signal of said first source of signals, a second means responsive to the pilot signal of said second source of signals and the reference signal of said second source of reference signal to lock the reference signal of said second source of reference signal in a predetermined phase relationship with respect to the pilot signal of said second source of signals, a first means coupled to said first source of signals and said first source of reference signal to produce a first control signal proportional to the amplitude of the pilot signal of said first source of signals, a second means coupled to said second source of signals and said second source of reference signal to produce a second control signal proportional to the amplitude of the pilot signal of said second source of signals, means responsive to said first and second control signals to control the amplitude of the signals of said first and second sources of signals to be substantially equal, a first demodulator coupled to said first source of signals, a second demodulator coupled to said second source of signals, a first means coupled to said first source of reference signal to couple the reference signal of said first source of reference signal to said first demodulator to produce at the output of said first demodulator the intelligence of said sideband signal, a second means coupled to said second source of reference signal to couple the reference signal of said second source of reference signal to said second demodulator to produce at the output of said second demodulator the intelligence of said sideband signal, and common means coupled to the output of each of said first and second demodulators to combine the demodulated intelligence of said sideband signals into a single intelligence signal output.

15. A single sideband suppressed carrier receiving system comprising a first source of signals, a second source of signals, the signals of each of said first and second sources being substantially inphase and including a signal proportional to a single sideband suppressed carrier signal and a pilot signal having a frequency related to the frequency of said suppressed carrier, a first source of reference signal having a frequency substantially equal to the frequency of said pilot signal, a second source of reference signal having a frequency substantially equal to the frequency of said pilot signal, a first means responsive to the pilot signal of said first source of signals and the reference signal of said first source of reference signal to lock the reference signal of said first source of reference signal in a predetermined phase relationship with respect to the pilot signal of said first source of signals, a second means responsive to the pilot signal of said second source of signals and the reference signal of said second source of reference signal to lock the reference signal of said second source of reference signal in a pretermined phase relationship with respect to the pilot signal of said second source of signals, a first means coupled to said first source of signals and said first source of reference signal to produce a first control signal proportional to the amplitude of the pilot signal of said first source of signals, a second means coupled to said second source of signals and said second source of reference signal to produce a second control signal proportional to the amplitude of the pilot signal of said second source of signals, means responsive to said first and second control signals to couple the largest of said first and second control signals to each of said sources of signals to control the amplitude of the signals of said first and second sources of signals equally, a first demodulator coupled to said first source of signals, a second demodulator coupled to said second source of signals, a first means coupled to said first source of reference signal to couple the reference signal of said first source of reference signal to said first demodulator to produce at the output of said first demodulator the intelligence of said sideband signal, a second means coupled to said second source of reference signal to couple the reference signal of said second source of reference signal to said second demodulator to produce at the output of said second demodulator the intelligence of said sideband signal, and means common to the output of said first and second demodulators to combine the demodulated intelligence of said sideband signals into a single intelligence signal output.

16. A single sideband suppressed carrier receiving system comprising a first source of signals, a second source of signals, the signals of each of said first and second sources being substantially inphase and including a signal proportional to a single sideband suppressed carrier signal and a pilot signal having a frequency related to the frequency of said suppressed carrier, a first source of reference signal having a frequency substantially equal to the frequency of said pilot signal, a second source of reference signal having a frequency substantially equal to the frequency of said pilot signal, a first means responsive to the pilot signal of said first source of signals and the reference signal of said first source of reference signal to lock said reference signal of said first source of reference signal in a predetermined phase relationship with respect to the pilot signal of said first source of signals, a second means responsive to the pilot signal of said second source of signals and the reference signal of said second source of reference signal to lock the reference signal of said second source of reference signal in a predetermined phase relationship with respect to the pilot signal of said second source of signals, a first means coupled to said first source of signals and said first source of reference signal to produce a first control signal proportional to the amplitude of the pilot signal of said first source of signals, a second means coupled to said second source of signals and said second source of reference signal to produce a second control signal proportional to the amplitude of the pilot signal of said second source of signals, means responsive to said first and second control signals to couple the largest of said first and second control signals to each of said sources of signals to control the amplitude of the signals of said first and second source of signals equally, a first demodulator coupled to said first source of signals, a second demodulator coupled to said second source of signals, a first phase shifter coupled to said first source of reference signal to couple the reference signal of said first source of reference signal to said first demodulator in a first predetermined phase relationship with respect to the phase of the reference signal of said first source of reference signal to produce at the output of said first demodulator the intelligence of said sideband signal, a second phase shifter coupled to said second source of reference signal to couple the reference signal of said second source of reference signal to said second demodulator in a second predetermined phase relationship with respect to the phase of the reference signal of said second source of reference signal to produce at the output of said second demodulator the intelligence of said sideband signal, and means common to the output of said first and second demodulators to combine the demodulated intelligence of said sideband signal into a single intelligence signal, said first and second predetermined phases of said first and second phase shifters being related to each other to provide the same amplitude output signal at the output of said common means even if one of the signals of said sources of signals is lost.

17. A single sideband suppressed carrier receiving system comprising a first source of signals, a second source of signals, the signals of each of said first and second sources being substantially inphase and including a signal proportional to a single sideband suppressed carrier signal and a pilot signal having a frequency related to the frequency of said suppressed carrier, a first source of reference signal having a frequency substantially equal to the frequency of said pilot signal, a second source of reference signal having a frequency substantially equal to the frequency of said pilot signal, a first means responsive to the pilot signal of said first source of signals and the reference signal of said first source of reference signal to lock said reference signal of said first source of reference signal in a 90 degree phase relationship with respect to the pilot signal of said first source of signals, a second means responsive to the pilot signal of said second source of signals and the reference signal of said second source of reference signal to lock the reference signal of said second source of reference signal in a 90 degree phase relationship with respect to the pilot signal of said second source of signals, a first means coupled to said first source of signals and said first source of reference signal to produce a first control signal proportional to the amplitude of the pilot signal of said first source of signals, a second means coupled to said second source of signals and said second source of reference signals to produce a second control signal proportional to the amplitude of the pilot signal of said second source of signals, means responsive to said first and second control signals to couple the largest of said first and second control signals to each of said sources of signals to control the amplitude of the signals of said first and second sources of signals equally, a first demodulator coupled to said first source of signals, a second demodulator coupled to said second source of signals, a first phase shifter coupled to said first source of reference signal to advance the phase of the reference signal of said first source of reference signal 60 degrees, means coupling the output of said first phase shifter to said first demodulator to produce at the output of said first demodulator the intelligence of said sideband signal, a second phase shifter coupled to said second source of reference signal to retard the phase of the reference signal of said second source of reference signal 60 degrees, means coupling the output of said second phase shifter to said second demodulator to produce at the output of said second demodulator the intelligence of said sideband signal, and means common to the output of said first and second demodulators to combine the demodulated intelligence of said sideband signal into a single intelligence signal, said single intelligence signal having the same amplitude even if the signal of one of said sources of signals is lost.

18. A single sideband suppressed carrier receiving system comprising a first signal channel responsive to a first channel signal including a single sideband suppressed carrier signal and a pilot signal having a frequency related to the frequency of said suppressed carrier, a second signal channel responsive to a second channel signal including said single sideband suppressed carrier signal and said pilot signal, said first and second channel signals having random phase relationships with respect to each other, each of said signal channels including a heterodyning means to translate the center frequency of said channel signals to a given common center frequency and an amplifier coupled to the output of said heterodyning means for amplification of said frequency translated signal, means coupled to the output of said amplifiers to combine the signals thereof into a single signal, a phase-comparing arrangement coupled to the output of each of said amplifiers to produce a first control signal proportional to the phase difference between the output signals of said amplifiers and means to couple said first control signal to said heterodyning arrangement to adjust the output signals of said heterodyning arrangement relative to each other to enable the inphase combining of the outputs of the amplifiers in said combiner, a source of reference signal having a frequency substantially equal to the frequency of said pilot signal, means coupled to said combiner means and said source of reference signal responsive to said pilot signal and said reference signal to lock said reference signal in a predetermined phase relationship with respect to said pilot signal, means coupled to said combiner means and said source of reference signal responsive to said pilot signal and said reference signal to produce a second control signal proportional to the amplitude of said pilot signal, means coupling said second control signal to each of said amplifiers to control the gain of said amplifiers equally, a demodulator coupled to said combiner means and means coupled to said source of reference signal to couple said reference signal to said demodulator to produce at the output of said demodulator the intelligence of said sideband signal.

19. A single sideband suppressed carrier receiving system comprising a first signal channel responsive to a first channel signal, a second signal channel responsive to a second channel signal, a third signal channel responsive to a third channel signal, a fourth signal channel responsive to a fourth channel signal, each of the channel signals including a single sideband suppressed carrier signal and a pilot signal having a frequency related to the frequency of said suppressed carrier and having random phase relationship with respect to each other, a heterodyning means included in each of said receiving signal channels to translate the center frequency of said channel signal to a given common center frequency, an amplifier coupled to the output of each of said heterodyning means for amplification of the frequency translated signals, a first additive combiner coupled to the output of the amplifier in said first signal channel and the output of the amplifier in the second signal channel, a phase-comparing arrangement coupled to the output of the amplifiers of said first and second signal channels to produce a first control signal proportional to the phase difference between the signal outputs of the amplifiers of said first and second signal channels, means coupling said first control signal to said heterodyning means of said first and second channels to adjust the phase of the output signals of said heterodyning means of said first and second channels to enable the substantially inphase combining of the signals at the output of the amplifiers of said first and second channels in said first combiner means, a second additive combiner means coupled to the outputs of the amplifiers of said third and fourth signal channels, a second phase-comparison arrangement coupled to the outputs of the amplifiers of the third and fourth signal channels to produce a second control voltage proportional to the phase difference between the output signals of the amplifiers of said third and fourth channels, means coupling said second control signal to the heterodyning means of said third and fourth channels to adjust the relative phase of the output signals thereof to enable the substantially inphase combining of the output signals of the amplifiers of the third and fourth channels in said second combining means, a third additive combiner means coupled to the output of said first and second combiners, a fourth additive combiner means coupled to the output of said first and second combiners, means coupling the outputs of said third and fourth combiners to each other, a third phase-comparing arrangement responsive to the signal outputs of said first and second combiners to produce a third control signal proportional to the phase difference between the outputs of the signals of the first and second combiners, means coupling said third control signal to said first and second phase-comparing arrangement to adjust the signals of said first and second signal channels relative to the signals of said third and fourth signal channels for substantially inphase combining in said third and fourth combiners, a first source of reference signal having a frequency substantially equal to the frequency of said pilot signal, a second source of reference signal having a frequency substantially equal to the frequency of said pilot signal, a first means coupled to said first source of reference signal and said third and fourth combiners responsive to said pilot signal and the reference signal of said first source of reference signal to lock the reference signal of said first source of reference signal in a predetermined phase relationship with respect to said pilot signal, a second means coupled to said third and fourth combiners and to said second source of reference signal responsive to said pilot signal and the reference signal of said second source of reference signal to lock the reference signal of said second source of reference signal in a predetermined phase relationship with respect to said pilot signal, means coupled to said third and fourth combiners and said first source of reference signal responsive to said pilot signal and the reference signal of said first source of reference signal to produce a fourth control signal proportional to the amplitude of said pilot signal, means coupled to said third and fourth combiners and said second source of reference signal responsive to said pilot signal and the reference signal of said second source of reference signal to produce a fifth control signal proportional to the amplitude of said pilot signal, means responsive to said fourth and fifth control signals to couple the larger of said fourth and fifth control signals to each of said amplifiers disposed in said signal channels to control the gain of the amplifiers equally, a first demodulator coupled to said third and fourth combiners, a second demodulator coupled to said third and fourth demodulators, a means coupled to said first source of reference signal to couple the reference signal thereof to said first demodulator to produce at the output of said first demodulator the intelligence of said sideband signal, means coupled to said second source of reference signal to couple the reference signal thereof to said second demodulator to produce at the output of said second demodulator the intelligence of said sideband signal, and means coupled in common to the output of said first and second demodulators to combine the demodulated intelligence signals at the output thereof to form a single intelligence signal.

20. A single sideband suppressed carrier receiving system comprising a first signal channel responsive to a first channel signal, a second signal channel responsive to a second channel signal, a third signal channel responsive to a third channel signal, a fourth signal channel responsive to a fourth channel signal, each of the channel signals including a single sideband suppressed carrier signal and a pilot signal having a frequency related to the frequency of said suppressed carrier and having random phase relationship with respect to each other, a heterodyning means included in each of said receiving signal channels to translate the center frequency of said channel signal to a given common center frequency, an amplifier coupled to the output of each of said heterodyning means for amplification of the frequency translated signals, a first additive combiner coupled to the output of the amplifier in said first signal channel and the output of the amplifier in the second signal channel, a phase-comparing arrangement coupled to the output of the amplifiers of said first and second signal channels to produce a first control signal proportional to the phase difference between the signal outputs of the amplifiers of said first and second signal channels, means coupling said first control signal to said heterodyning means of said first and second channels to adjust the phase of the output signals of said heterodyning means of said first and second channels to enable the substantially inphase combining of the signals at the output of the amplifiers of said first and second channels in said first combiner means, a second additive combiner means coupled to the outputs of the amplifiers of said third and fourth signal channels, a second phase-comparison arrangement coupled to the outputs of the amplifiers of the third and fourth signal channels to produce a second control voltage proportional to the phase difference between the output signals of the amplifiers of said third and fourth channels, means coupling said second control signal to the heterodyning means of said third and fourth channels to adjust the relative phase of the output signals thereof to enable the substantially inphase combining of the output signals of the amplifiers of the third and fourth channels in said second combining means, a third additive combiner means coupled to the output of said first and second combiners, a fourth additive combiner means coupled to the output of said first and second combiners, means coupling the outputs of said third and fourth combiners to each other, a third phase-comparing arrangement responsive to the signal outputs of said first and second combiners to produce a third control signal proportional to the phase difference between the outputs of the signals of the first and second combiners, means coupling said third control signal to said first and second phase-comparing arrangement to adjust the signals of said first and second signal channels relative to the signals of said third and fourth signal channels for substantially inphase combining in said third and fourth combiners, a first source of reference signal having a frequency substantially equal to the frequency of said pilot signal, a second source of reference signal having a frequency substantially equal to the frequency of said pilot signal, a first means coupled to said first source of reference signal and said third and fourth combiners responsive to said pilot signal and the reference signal of said first source of reference signal to lock the reference signal of said first source of reference signal in a predetermined phase relationship with respect to said pilot signal, a second means coupled to said third and fourth combiners and to said second source of reference signal responsive to said pilot signal and the reference signal of said second source of reference signal to lock the reference signal of said second source of reference signal in a predetermined phase relationship with respect to said pilot signal, means coupled to said third and fourth combiners and said first source of reference signal responsive to said pilot signal and the reference signal of said first source of reference signal to produce a fourth control signal proportional to the amplitude of said pilot signal, means coupled to said third and fourth combiners and said second source of reference signal responsive to said pilot signal and the reference signal of said second source of reference signal to produce a fifth control signal proportional to the amplitude of said pilot signal, means responsive to said fourth and fifth control signals to couple the larger of said fourth and fifth control signals to each of said amplifiers disposed in said signal channels to control the gain of the amplifiers equally, a first demodulator coupled to said third and fourth combiners, a second demodulator coupled to said third and fourth demodulators, a first phase shifter coupled to said first source of reference signal to advance the phase of the reference signal of said first source of reference signal 60 degrees, means coupling the output of said first phase shifter to said first demodulator to produce at the output of said first demodulator the intelligence of said sideband signal, a second phase shifter coupled to said second source of reference signal to retard the phase of the reference signal of said second source of reference signal 60 degrees, means coupling the output of said second phase shifter to said second demodulator to produce at the output of said second demodulator the intelligence of said sideband signal, and means common to the output of said first and second demodulators to combine the demodulated intelligence of said sideband signal into a single intelligence signal, said single intelligence signal having the same amplitude even if the signal of one of said sources of signals is lost.

References Cited in the file of this patent

UNITED STATES PATENTS

| | | |
|---|---|---|
| 2,333,335 | Peterson | Nov. 2, 1943 |
| 2,783,372 | Peterson et al. | Feb. 26, 1957 |
| 2,903,576 | Altman | Sept. 8, 1959 |
| 2,921,188 | Ringoen | Jan. 12, 1960 |
| 2,927,202 | Lakatos | Mar. 1, 1960 |

FOREIGN PATENTS

| | | |
|---|---|---|
| 749,038 | Great Britain | May 16, 1956 |

OTHER REFERENCES

"Principles of Color Television," by the Hazeltine Laboratories Staff, copyright 1956, page 396.